Sept. 5, 1939.  C. T. WALLIS ET AL  2,171,957
OIL BURNER CONTROL
Filed Nov. 9, 1936
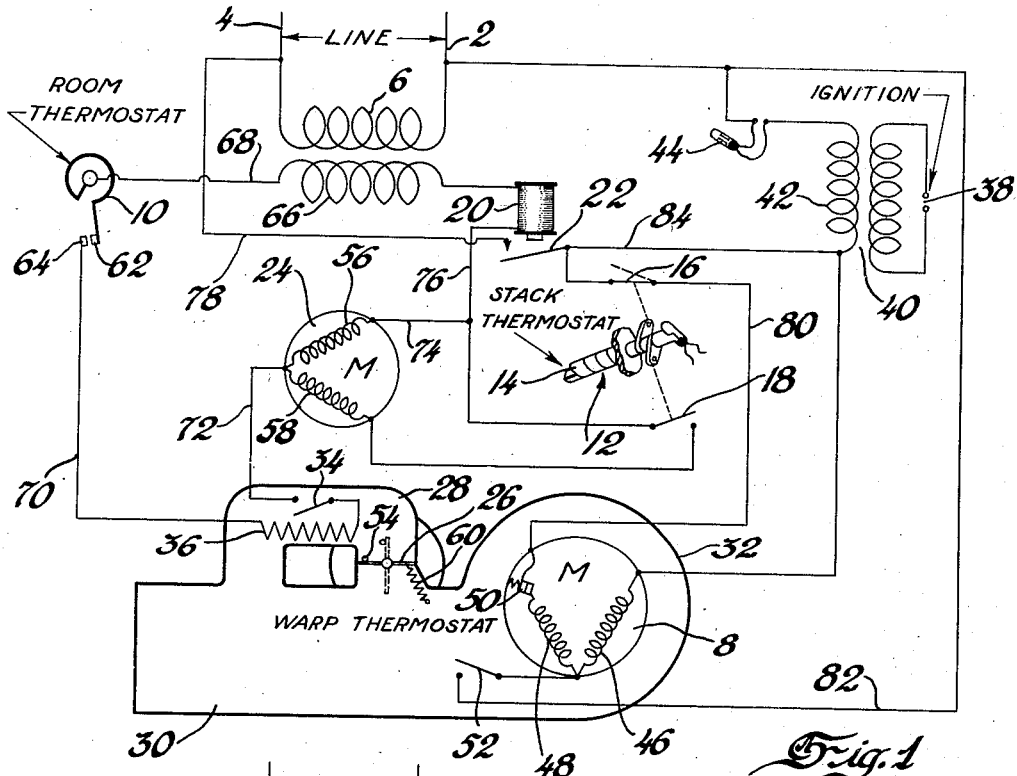
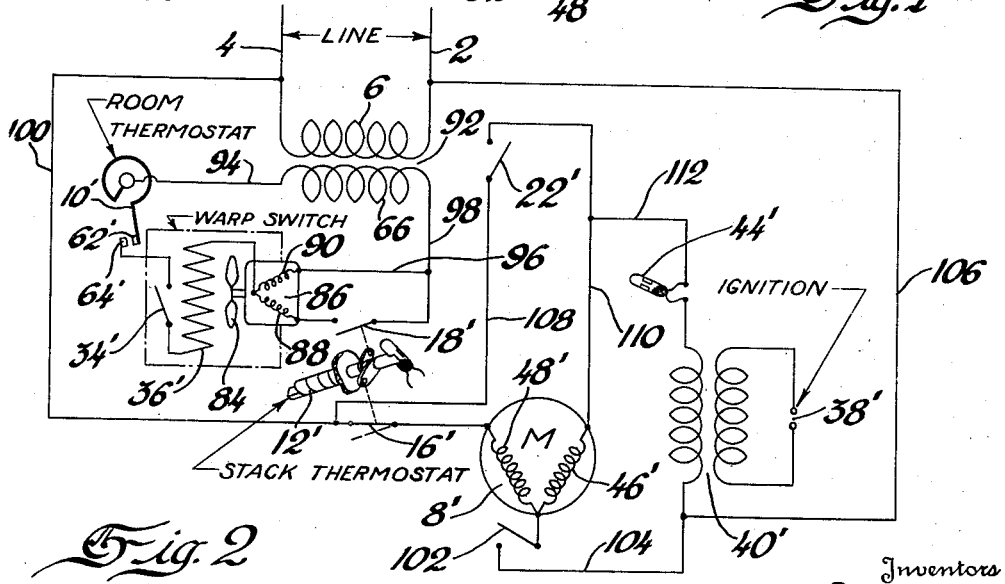
Inventors
Cyril T. Wallis &
William H. Hutchins
By Blackmore, Spencer & Flint
Attorneys Patented Sept. 5, 1939

2,171,957

UNITED STATES PATENT OFFICE 2,171,957

OIL BURNER CONTROL

Cyril T. Wallis and William H. Hutchins, Rochester, N. Y., assignors to General Motors Corporation, Detroit, Mich., a corporation of Delaware Application November 9, 1936, Serial No. 109,862

4 Claims. (Cl. 158—28)

This invention relates to control systems for operating electric motors and more specifically to control systems involving various safety features applicable to fluid fuel burners.

In the control of fluid fuel burners it is necessary to provide means responsive to temperature conditions within the space to be heated to cause the energization or deenergization of the burner for supplying heat.

It is further necessary to provide safety means therein which will prevent explosions or injury to the apparatus due to abnormal conditions such as flame failure or failure of the burner to initially start.

Another feature which must be taken into consideration is the breakage of one of the circuits and the system should be provided so that a breakage will cause the system to be inoperative.

It is therefore the object of our invention to provide a system for controlling fluid fuel feeding motors which is simple and which provides the necessary safety factors as pointed out above. With this and other objects in view the embodiments of our invention are set forth in the following specification and claims and illustrated in the drawing, in which:

Figure 1 shows a schematic wiring diagram of a control system of our invention.

Figure 2 shows a schematic wiring diagram of a modified form of our invention.

Referring now specifically to Figure 1, a source of current, usually at a potential of 110 volts, is supplied to line 2—4 across which is connected the primary 6 of a transformer. A motor 8 is provided for the expulsion of fuel and air into the burner, said motor being controlled by a room thermostat 10 sensitive to temperature conditions within the space to be heated. A stack thermostat 12 for controlling the motor is also provided which is sensitive to combustion conditions within the burner per se, said stack thermostat composed of a bimetallic element 14 which upon expanding actuates a plurality of switches such as 16 and 18.

The motor is also controlled by a relay 20 which operates the motor switch 22. A split phase motor 24 is utilized to control a valve 26 in a by-pass 28 on the fuel and air directing duct 30 of the housing 32 for the blower operated by motor 8. Within the by-pass 28 is located a warp switch 34 controlled by an electric heating element 36 which affects the bimetallic element thereof. The burner is ignited by means of sparks jumping across a spark gap 38 provided with high tension current by the transformer 40, the primary 42 of which is connected in circuit with the motor and controlled by switch 44 operated by the stack thermostat. The motor 8 in this instance includes two windings 46 and 48, the former being the running winding which normally operates the motor and the latter being the starting winding which it is necessary to energize in order to start the motor in operation. In series with the starting winding is a centrifugal governor switch 50 and in series with both windings through the motor is a thermo cut-out switch 52 to prevent the motor from over-heating.

The auxiliary motor 24 which operates the valve 26 through any desired shaft connection, not shown, is of the split phase type and is a stall motor; in other words, the motor will rotate to turn the same through a certain angular displacement causing the valve to engage a stop, such as 54, and then hold the same in that position until deenergized. The two phases of this split phase motor 56 and 58 have to be energized in order for the motor to operate, one winding being insufficient to do so. The valve is biased to closed position by a spring 60 so that if the auxiliary motor is not energized the by-pass will be closed to the flow of air. The operation of this device is as follows: When the room thermostat 10 calls for heat, due to a drop in temperature in the space to be heated, it closes its contacts 62—64 and completes a circuit from the secondary 66 of the line transformer through line 68, contacts 62—64, line 70, heating coil 36, warp switch 34, line 72, auxiliary motor winding 56, line 74, line 76, relay coil 20 back to the secondary. As will be noted, this energizes coil 36, winding 56 and relay coil 20. The latter closes its contact 22 which energizes the main fuel supply motor through the following circuits, both windings of the main motor now being energized: Line 78, switch 22, stack switch 16 (closed when cold), line 80, centrifugal governor switch 50, starting winding 48, motor thermo cut-out 52 and line 82 back to incoming line 2. At this time the motor running winding is energized by a parallel circuit from switch 22 to line 84, running winding 46 to the motor thermo cut-out 52. The motor thus starts and projects fuel and air into the combustion chamber and through an obvious circuit through primary 42 of the ignition transformer and switch 44 (closed when the stack is cold), the ignition transformer is energized causing sparks to jump across the gap 38 which ignites the incoming fuel. The fuel and air pass through the conduit 30 into a position to burn and a certain amount of the air will pass through the by-pass 28 depending upon the position of the valve 26.

It will be apparent that applicants may locate switch 12 which controls the motorized valve 26 at any place in the heating system, and provide electrical wire connection to the auxiliary motor for actuating the valve; which feature adds flexibility and ease of installation to the system.

As noted above, when the room thermostat closes, one of the windings, namely 56 of the auxiliary split phase motor, is energized but the other winding 58 is deenergized due to the fact that the switch 18 in circuit therewith is normally open when cool, said switch being controlled by the stack thermostat.

It should also be noted that when the room thermostat closes the electric heating element 36 is energized to supply heat for the warp switch and after a predetermined interval said warp switch will open to deenergize the whole system. Considering therefore that the burner operates normally, ignites and provides heat, the stack thermostat will operate to open switch 16 which breaks a circuit to the starting winding 48 of motor 8 and closes switch 18 which completes the circuit for the winding 58 of the split phase motor 24. At this time, therefore, both windings 56 and 58 are energized causing the motor 24 to open the valve 26 in the by-pass which allows air to pass over the heating element 36 to cool the same and prevent the warp switch 34 from actuating. The burner therefore proceeds to supply heat until the room thermostat is satisfied at which time the latter contacts open and the whole system is deenergized.

If the burner normally fails to ignite, the stack switch will not rotate to close switch 18 and the stall motor will therefore not operate to open valve 26 and after a predetermined length of time the electric heating coil 36 will cause the warp switch 34 to open, deenergizing the whole system and requiring a manual reset.

If at any time the flame within the burner goes out before the call for heat has been satisfied, the stack thermostat will begin to cool down which will cause switch 18 to open and the stall motor will then be unable to maintain the valve 26 in open position, the latter will close and the heating coil 36 of the warp switch will cease to be cool and cause its contact 34 to open.

If there is a current failure and the main motor ceases to run, it cannot be started again until the stack cools down to close switch 16 so that the starting winding 48 may be energized to start the motor.

The modification shown in Figure 2 illustrates a slightly different form of apparatus working on the same general idea and in this instance a similar main motor 8' having a starting and a running winding 48' and 46' respectively is used to project fuel into the burner and the ignition transformer 40' furnishes high tension current for the spark gap 38' for ignition and is controlled by ignition switch 44' actuated by a stack thermostat 12'.

An electrically heated warp switch 34' with its heating element 36' is used for safety purposes as in the former illustration and in this case is placed in the path of a stream of air to dissipate the heat generated by 36' under certain conditions. This heating coil is directly in series with the secondary and energized at all times that the secondary is complete for normal operation. The air stream for said dissipation is provided by a fan 84 which is driven by a split phase motor 86 similar to the split phase motor 24 of the illustration shown in Figure 1, said split phase motor having two coils 88 and 90 which both have to be energized before the fan will operate.

A room thermostat 10' is provided as well as a main transformer 92 whose primary 6 is connected into lines 2 and 4 and whose secondary 66 provides current for the control circuit as before. The stack switch 12' also operates two switches 16' and 18' as before. The transformer 92 in this case acts also as a relay to operate the motor switch 22'. The operation of this circuit is as follows: When the room thermostat calls for heat, due to a decrease in temperature in the space to be heated, its contacts 62' and 64' are closed which completes a circuit from secondary 66 of the transformer 92, line 94, room thermostat contacts 62'—64', warp switch 34', heating coil 36', auxiliary motor winding 90, line 96, and 98 back to the secondary 66. This energizes both the heating coil 36' and one coil of the split phase motor 86 and at the same time causes the transformer to pull in and close the motor switch 22'. The switch 16' is normally closed when the stack is cold and 18' normally open so that when switch 22' is closed the main motor 8' will be energized to start through the following circuit: Line 4, line 100, switch 16', starting winding 48', motor thermo cut-out 102, line 104, and 106 back to line 2. At this time also the running winding is energized through a parallel circuit as follows: Line 108, switch 22', and line 110 through the running winding 46' to the thermo cut-out 102. Thus both windings are energized in the main motor and it starts up projecting air and fuel into the combustion chamber. At the same time the ignition circuit is energized inasmuch as it is across the motor through lines 112, combustion control switch 44', primary of the ignition transformer 40' back to line 104. This causes the ignition to be energized, the oil is ignited and the furnace normally started.

It will be noted that during this period the heating element 36' of the warp switch is supplying heat to the bimetallic element to throw out switch 34'. If the burner ignites, the stack switch will turn causing switch 44' to be cut off deenergizing the ignition and at the same time opening switch 16' which deenergizes the starting winding 48' of the motor 8' and closing switch 18' which completes an obvious circuit for winding 88 of the split phase motor 86. Since both windings are energized in the auxiliary motor, the fan 84 is driven to supply air to cool the heating element of the warp switch and prevent the warp switch from opening. If, however, the burner does not ignite, switch 18' will not be closed and the fan will not supply air and the warp switch will be opened by excess heat supply to deenergize the circuit. If there is a flame failure after the burner has ignited normally, the stack will be caused to cool down which will open switch 18' deenergizing the fan motor and the warp switch will of course after a predetermined time open to deenergize the circuit since the heat supply will then actuate the switch.

If there is a current failure, the main motor 8' cannot be energized until the stack is cooled efficiently to close switch 16' so that the starting winding 48' may be energized. In this way the delay causes the fumes from the hot furnace to escape and prevents an explosion.

It will thus be evident that we have provided a circuit which fulfills the various safety requirements and is simple and efficiently operated.

We claim:

1. In a control system for fluid fuel burners, a motor for propelling fuel to the burner and a circuit for said motor, means to control the energization of said motor circuit including a safety warp switch, a heating element for said warp switch, said switch being normally closed and adapted to open within a predetermined time under the influence of said heating element to deenergize the motor circuit, means to supply air to cool the heating element of said warp switch to prevent the opening thereof, and means to control said air supply including an auxiliary motor and a switch to control said auxiliary motor, said switch being normally open and adapted to close to energize said auxiliary motor in response to heat produced by the burner flame.

2. In a control system for fluid fuel burners, a motor for propelling fuel to the burner and a circuit for said motor, means to control the energization of said motor circuit including a safety warp switch, a heating element for said warp switch, said switch being normally closed and adapted to open within a predetermined time under the influence of said heating element to deenergize the motor circuit, means to supply air to cool the heating element of said warp switch to prevent the opening thereof, said means comprising a fan and an auxiliary motor for operating said fan, and a switch to control said auxiliary motor, said switch being normally open and adapted to close to energize said auxiliary motor in response to heat produced by the burner flame.

3. In a control system for fluid fuel burners having a motor for propelling fuel and air under pressure to the burner with a control circuit for said motor and a duct for said air, means to control the energization of said motor circuit including a safety warp switch, a heating element for said warp switch, said warp switch being normally closed and adapted to open within a predetermined time under the influence of said heating element to deenergize the motor circuit, said warp switch and heating element being located within a lateral extension of said air duct, and means to control the passage of air from said duct over said warp switch and heating element to prevent the opening thereof when cooled by said air comprising a valve between said duct and said extension thereof, an auxiliary motor for operating said valve to open position upon energization of said auxiliary motor, and a normally open switch adapted to close to energize said auxiliary motor in response to heat produced by the burner flame.

4. In a control system for fluid fuel burners, a motor for propelling fuel to the burner, a control circuit and a motor circuit, said motor circuit being energized in response to closure of said control circuit, said control circuit including a room thermostat and a thermal safety switch having an electric heating element in series therewith, said safety switch being normally closed and adapted to open within a predetermined time under the influence of said heating element, means to supply air to cool the heating element of said safety switch to prevent the opening thereof, and means to control said air supply including an auxiliary motor having two windings both of which must be energized to operate said motor, one of said windings being in series with said thermostat, heating element, and safety switch, and the other winding being in a circuit which is parallel to said control circuit, and a switch in said parallel circuit, said switch being normally open and means to close said switch in response to heat produced by the burner flame.

CYRIL T. WALLIS.
WILLIAM H. HUTCHINS.